United States Patent Office 2,707,200
Patented Apr. 26, 1955

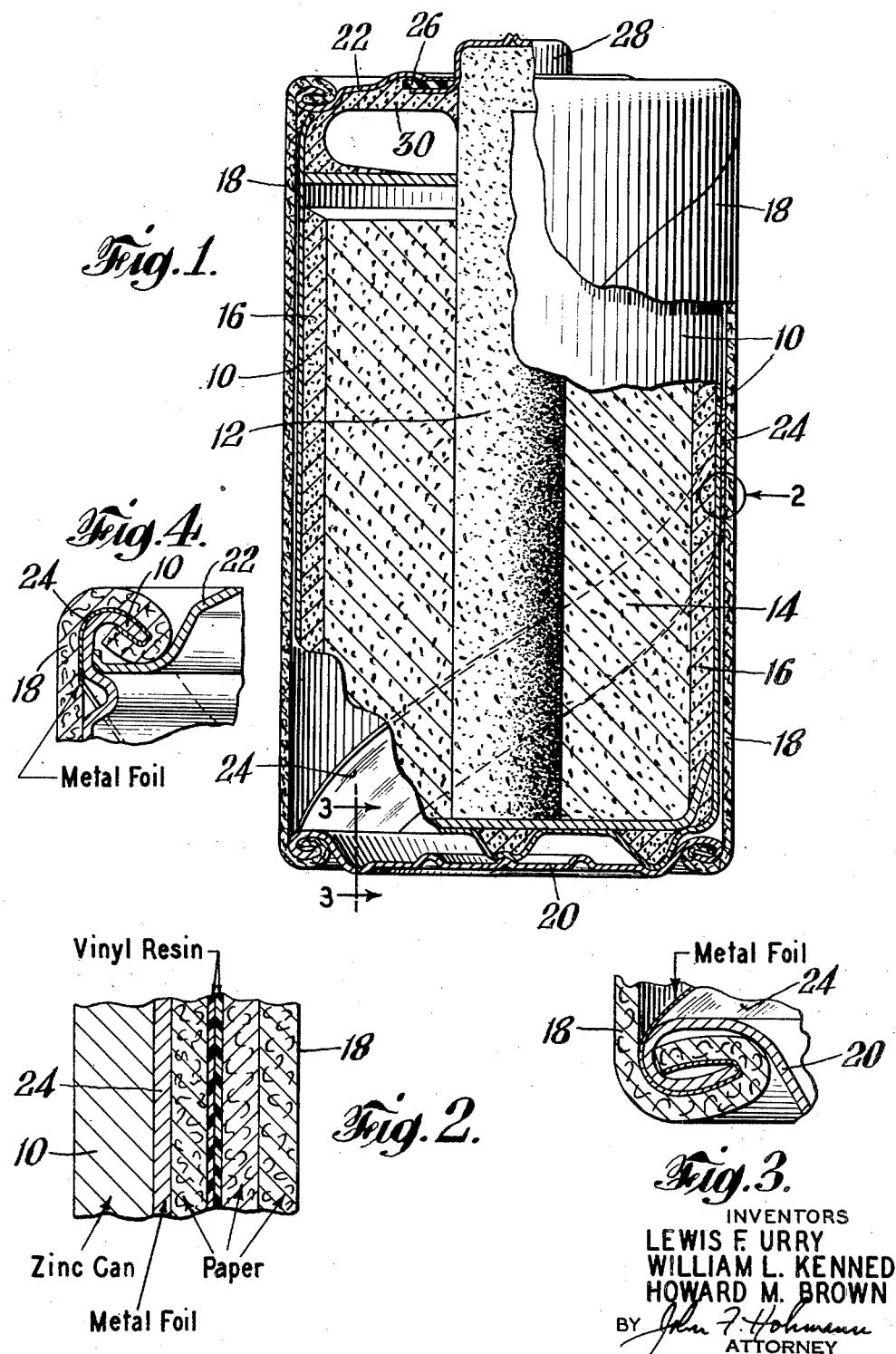

2,707,200

LEAK-RESISTANT DRY CELL

Lewis F. Urry, William L. Kennedy, and Howard M. Brown, Toronto, Ontario, Canada, assignors to Union Carbide Canada Limited, a corporation of Canada Application March 15, 1954, Serial No. 416,347

8 Claims. (Cl. 136—133)

This invention relates to leak-resistant dry cells of the type having an electrically non-conductive container or sheath surrounding the cell proper.

One of the most serious problems confronting the maker and user alike of primary galvanic cells has been that of leakage of liquid from the cells during or after use. Much of the art's attention has been directed to this problem over at least the past decade, and many proposals for its solution have been advanced.

One proposal that has been adopted commercially is that the conventional cell be encased within a container comprising a tube of electrically non-conductive material having a liquid-proof barrier, a metallic "false" bottom, and a top closure. Difficulty has been encountered, however, in maintaining electrical contact between the bottom of the container and the metal electrode of the cell. This difficulty has, in turn, led to many suggestions for incorporation of contacting elements between the metal electrode and the container bottom. Such proposals, however, increase the difficulty and cost of manufacture of the cells. Another proposal that has been advanced is that the electrically non-conductive tube be lined with metal foil, but this construction runs the risk of defeating the basic purpose of the use of such a tube, for the tube is made of a bibulous material intended to soak up liquid escaping from the cell; and the foil lining, and any adhesive used to secure it, interfere with the function of the tube. Further, a complete foil lining would interfere with venting of gas through the tube.

This invention has for its principal object, the provision of good electrical contact between the bottom of a cell container of electrically non-conductive bibulous material having a moisture barrier and the metal electrode of the cell contained therein without interference with the function of the bibulous material and without barring venting of gas through the container wall.

In the drawing:

Fig. 1 is a vertical elevation partially in section of a leak-resistant dry cell embodying the invention;

Fig. 2 is a greatly enlarged view of the encircled portion indicated at 2 in Fig. 1;

Fig. 3 is an enlarged detail view along the line 3—3 of Fig. 1 of a portion of the bottom of the cell; and Fig. 4 is an enlarged detail sectional view of the top portion of a cell illustrating another embodiment of the invention.

In accordance with the invention the interior wall of a non-metallic sheath for a dry cell is provided with an electrically conductive strip of foil such as aluminum adapted to make electrical contact with the container anode of the cell, the strip also being held in electrical contact with a metal bottom plate engaged by the end portions of the sheath. The sheath preferably is composed of a bibulous material and is provided with a moisture barrier. The conductive strip may also be mechanically secured to and in electrical contact with a top closure for the cell provided at the upper end of the sheath.

Referring to the drawing, a dry cell of conventional construction having a cupped container-anode 10 of consumable metal, a cathode 12 of carbon embedded in a depolarizer mix 14 within the container-anode 10 and separated therefrom by conventional gelled electrolyte 16, is provided with a non-metallic sheath 18, having locked thereto a metallic bottom plate 20 which underlies and is in contact with the bottom of the container-anode 10 and an annular top closure member 22. A foil strip 24 is provided on the inner walls of the sheath 18 and makes contact with the exterior wall of the container-anode 10. As shown in enlarged detail in Fig. 3 one end of the strip 24 is curled and locked into contact with the bottom plate 20. As shown in enlarged detail in Fig. 4, the other end of the foil strip 24 may be curled and locked into contact with the upper end of the container anode 10 and the closure member 22 if desired. This construction differs from that illustrated in Fig. 1 in that in the construction of Fig. 1 the upper end of the container-anode 10 is not curled or crimped with the upper end of the sheath 18 as it is in the modified construction of Fig. 4. In the construction illustrated in both Figs. 1 and 4 the closure of the cell is completed in conventional fashion, the inner edge of the closure member 22 resting upon an insulating washer 26 which is carried by a flanged metal terminal cap 28 mounted on the carbon cathode 12. A conventional inner seal 30 preferably of microcrystalline wax underlies the closure.

The sheath 18 is preferably composed of a plurality of layers of bibulous paper, such as kraft paper, as shown in enlarged sectional detail in Fig. 2. A moisture barrier, for instance a layer of plastic such as a vinyl resin is provided between layers of paper. This type of construction conveniently lends itself to manufacture by spiral winding technique. If the sheath is made in this way the foil strip can be incorporated at the same time, or it may be adhesively bonded to the interior of the sheath after the latter has been manufactured, if desired. It is preferred that the strip be spirally placed in the sheath in any event, both to provide a larger area of contact with the anode of the cell and to avoid the formation of a continuous longitudinal non-absorbent path adjacent to the anode.

The invention thus provides good electrical contact between the anode of the cell and the bottom plate of the leak-resistant container therefor and at the same time does not interfere with the moisture-absorbing function of the bibulous inner wall of the sheath.

We claim:

1. A leak-resistant dry cell comprising in part a container-anode of consumable metal, a non-metallic sheath having a moisture barrier embracing said container-anode, a metallic bottom plate locked to said sheath, a top closure for said container-anode in liquid-tight engagement with said sheath, and an electrically conductive strip between said sheath and said container-anode making electrical contact therewith and mechanically locked into engagement with said bottom plate.

2. A dry cell as defined in claim 1 in which said strip is of metal foil.

3. A dry cell as defined in claim 1 in which the portions of said sheath adjacent to said container-anode are of bibulous material.

4. A dry cell as defined in claim 1 in which said strip is mechanically locked into engagement with said top closure.

5. A dry cell as defined in claim 4 in which the portions of said sheath adjacent to said container-anode are of bibulous material.

6. A dry cell as defined in claim 5 in which said strip is of metal foil.

7. A dry cell as defined in claim 6 in which said strip is of aluminum foil.

8. A dry cell as defined in claim 7 in which said strip is curled with the upper end of said container-anode and said sheath.

References Cited in the file of this patent

UNITED STATES PATENTS

| | | |
|---|---|---|
| 2,411,272 | Keller | Nov. 19, 1946 |
| 2,445,005 | Schmelzer | July 13, 1948 |
| 2,450,813 | Reinhardt et al. | Oct. 5, 1948 |
| 2,524,668 | Keller | Oct. 3, 1950 |